United States Patent [19]
Allain

[11] 3,946,899
[45] Mar. 30, 1976

[54] SUGAR CANE PLANTER

[76] Inventor: Charles V. Allain, 902 2nd St., Franklin, La. 70538

[22] Filed: Feb. 7, 1975

[21] Appl. No.: 547,974

[52] U.S. Cl. .............................................. 221/225
[51] Int. Cl.² ........................................ A01C 11/00
[58] Field of Search ............ 221/225, 224; 111/2, 3

[56] References Cited
UNITED STATES PATENTS

| | | | |
|---|---|---|---|
| 3,286,858 | 11/1966 | Julien.................................. | 111/2 X |
| 3,468,441 | 9/1969 | Longman........................... | 111/2 X |

*Primary Examiner*—Stanley H. Tollberg
*Attorney, Agent, or Firm*—Wilkinson, Mawhinney & Theibault

[57] ABSTRACT

The present disclosure is directed to a sugar cane planter pivotally mounted on the rear of a cane cart which automatically receives cane stalks sitting on their butt ends and pushed rearwardly of a cane cart where they are to be planted either whole or in cut lengths and are engaged at their base or butt ends and directed rearwardly with the butts rearwardly of their tips so that the cane stalks fall butt end rearwardly where they are engaged by cane orienting plates which impart an upward and rearward vector to the stalks either whole or cut to orient them with their major axis substantially parallel to the major axis of the cane cart and substantially parallel to the ground in which attitude they fall into a cane dispensing trough which has a mouth parallel to the major axis of the cane cart and positioned above an open planting furrow for receiving the stalk in its horizontal attitude. The cane dispensing trough has two live surfaces which hydraulically pulsate between an open and closed position to assure feeding of stalks to the ground and which prohibit build up or clustering of stalks on a static surface which results in uneven planting feed of the stalks to the furrows. The planter is pivotally mounted at the rear of the cane cart so that the height and angle of the kicker may be varied to accommodate cane size and furrow opening. The frame assembly also may have a plow in advance of the planter to open the furrows to receive the cane stalks.

8 Claims, 7 Drawing Figures

SUGAR CANE PLANTER

An object of the present invention is to provide an improved cane planter over my prior U.S. Pat. No. 3,754,682 in that a high speed increased volume of cane seed stalks are delivered to the planting furrows with a metering, stalk orienting and dispensing action fully automatically.

A further object of the present invention is a cane planter which assembly may be attached to a cane cart carrying the cane stalks vertically standing on their butt ends and in which the stalks are metered rearwardly by advancing the stalk at its butt rearwardly so that the stalk will fall onto a moving plate butt end first where it will be kicked upwardly into a horizontal attitude for descent into a planting trough.

A still further object of the present invention is the provision of a planter for cane stalks either whole or cut above described wherein the stalks fall from the vertical position induced by the moving plate into a trough composed of two moving plates forming a mouth where they meet, which mouth is periodically opened and closed automatically to dispense the stalks into the furrows without buildup or clustering of the stalks.

With the foregoing and other objects in view the invention will be more fully described hereinafter and more particularly pointed out in the appended claims.

In the drawings in which like parts are denoted by reference characters throughout the several views.

Figure 1:
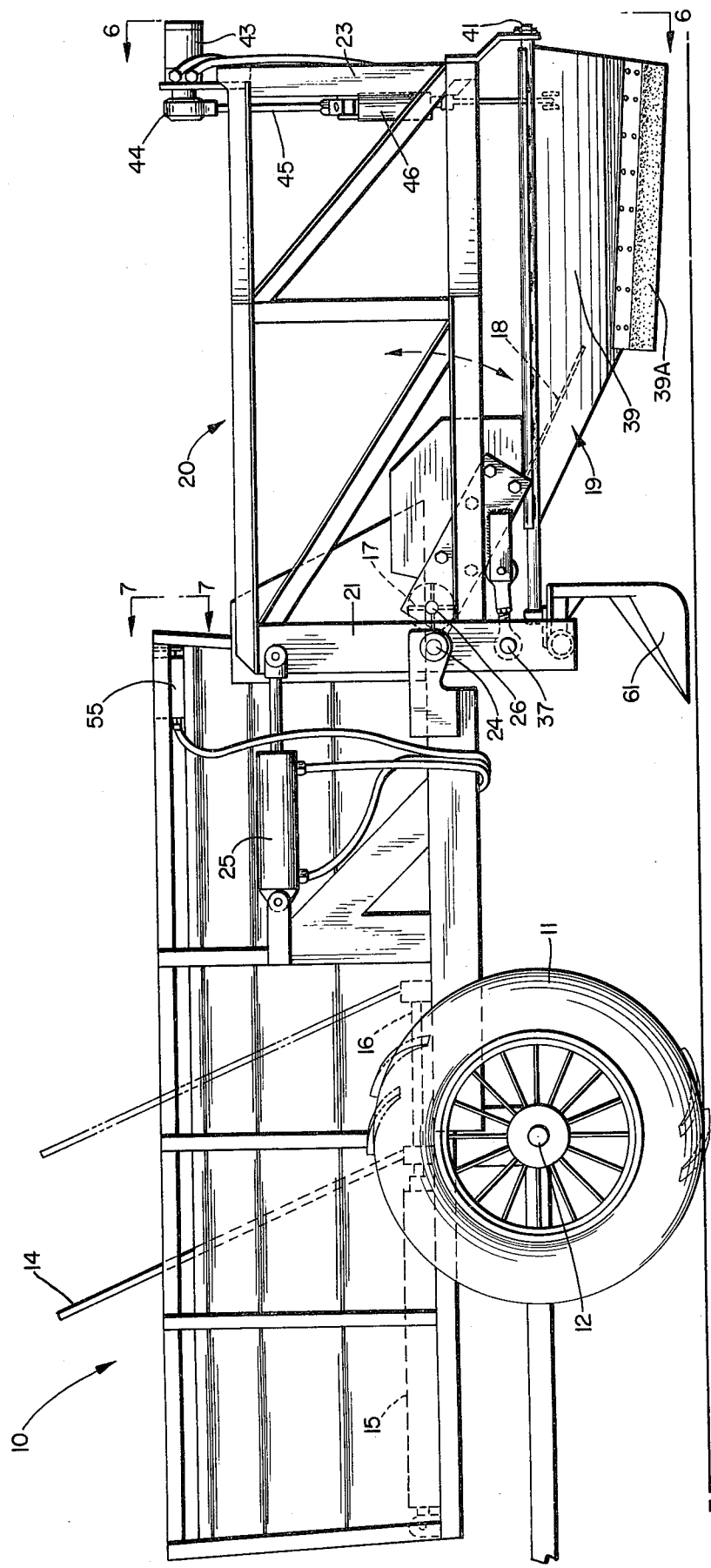
FIG. 1 is a side elevational view of a sugar cane planter installed on a cane cart with the metering device, cane orienting means and cane dispensing device with parts shown in solid and dotted lines.
Figure 2:
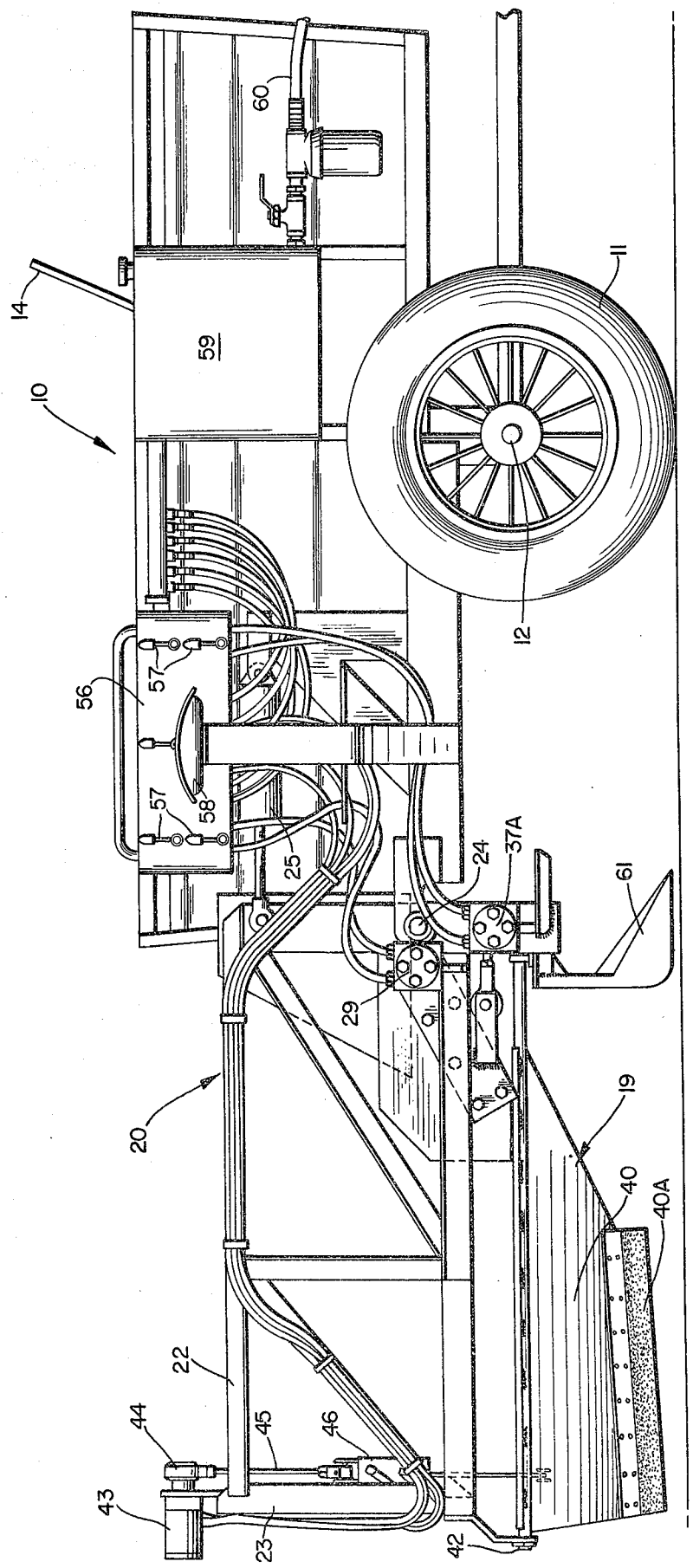
FIG. 2 is a side elevational view of the sugar cane planter of FIG. 1 from the opposite side.

Referring now to the drawings and for the moment to FIGS. 1 and 2, 10 designates a cane cart supported on ground transport wheels 11, carried on an axle 12. Mounted between the sides of the cart 10 is a cane pusher plate 14, moved from the front to the rear of the wagon by a cylinder and ram 15,16 of the type shown in U.S. Pat. No. 3,387,745. This wagon is built to receive the cane stalks A stood on their butt ends and to move the mass of stalks to the rear right hand end of FIG. 1, to a frame structure having metering means 17, cane orienting means 18 and cane dispensing means 19 forming the three cooperating interacting basic elements of the present invention.

The planting device of the present invention comprises a substantially U-shaped structure 20 having sides 21,22 and an end 23. This frame 20 is pivotally connected to the cane cart 10 at 24 by pivot mounts for each side 21,22. Above the pivot points 24 are hydraulic cylinder and rams 25, one end of each of which is secured to the frame 20 and the cane cart 10 to rock the frame 20 about the pivots 24.

METERING MEANS

Figure 3:
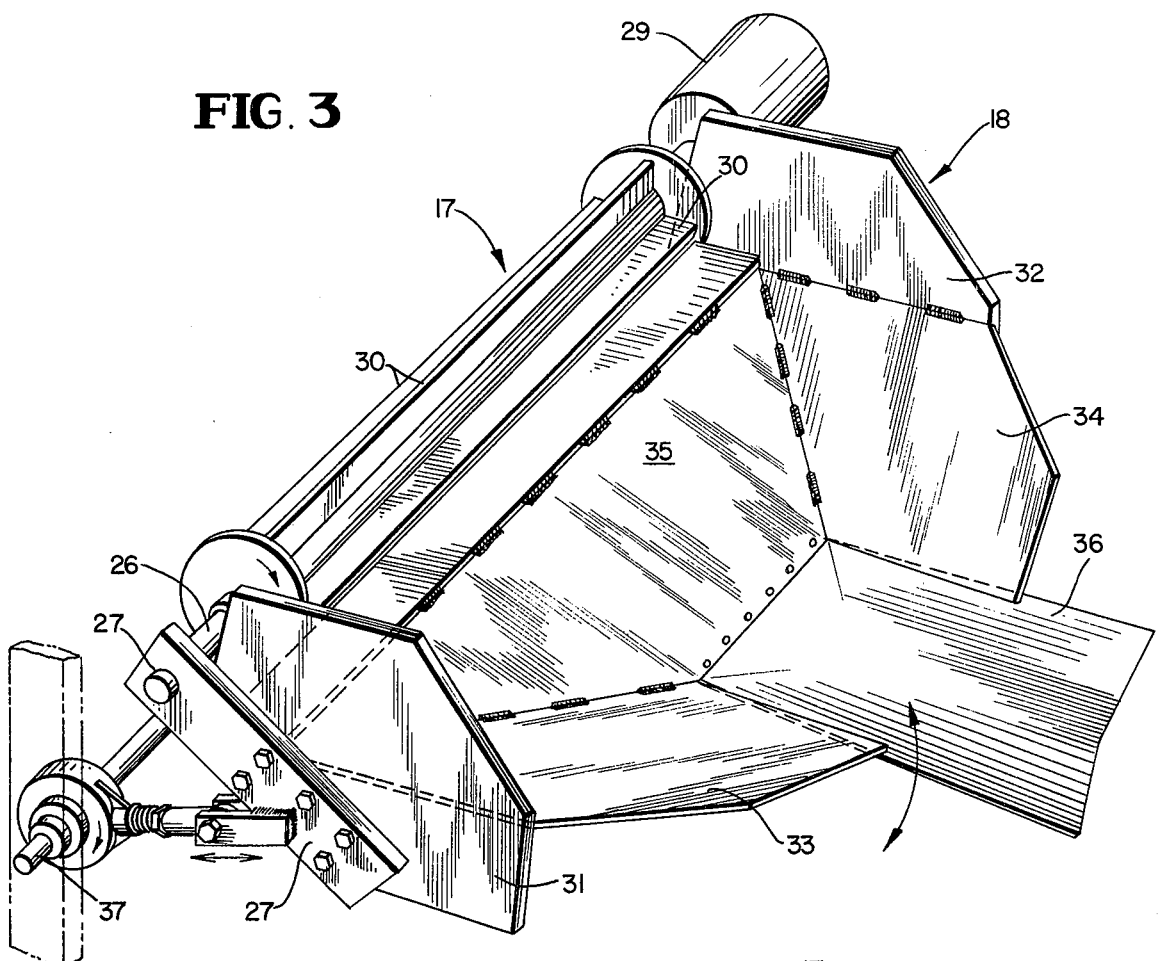
FIG. 3 is a perspective view of the cane metering device and cane orienting device employed with the present invention.
Figure 4:
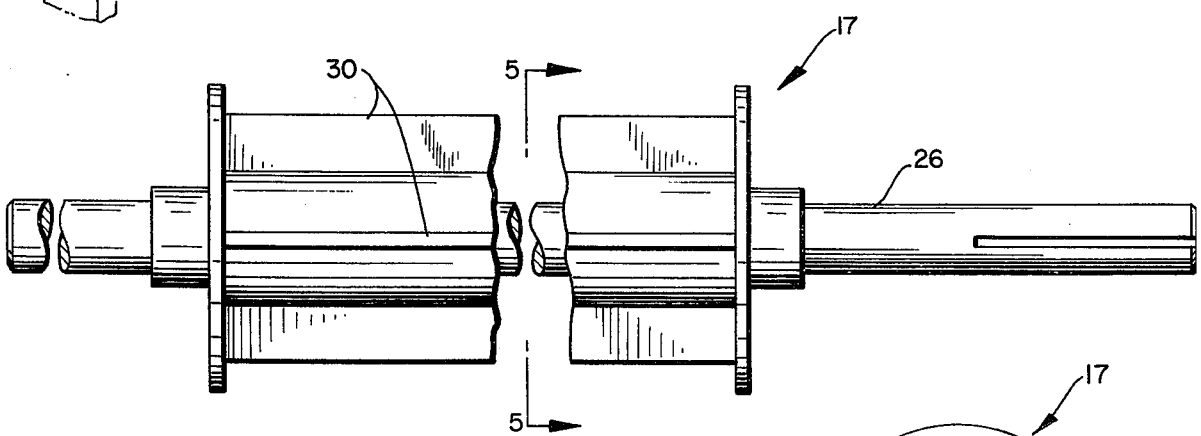
FIG. 4 is a side elevational view of the cane metering device of the present invention.
Figure 5:
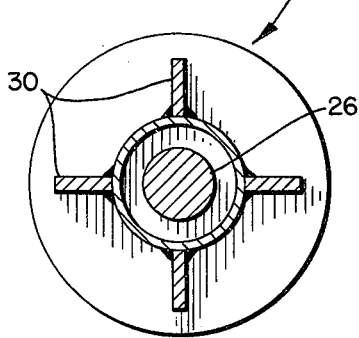
FIG. 5 is a vertical sectional view taken on the lines 5—5 in FIG. 4.

The metering means designated generally for quick identification as 17 comprises a horizontal shaft 26, best seen in FIGS. 3, 4 and 5, journaled in bearings 27,28 and driven by a hydraulic motor 29 supplied with operating fluid under variable speed valve control from the tractors hydraulic plant. Extending off the shaft 26 are blades or paddles 30 which engage the butt ends of the cane stalks A to kick the butt end from under the stalks in the direction of the arrow shown in FIG. 3. The stalks now fall where they are engaged by the cane orienting means 18.

CANE ORIENTING MEANS

As best seen in FIG. 3, the cane stalk orienting means 18 comprises a pair of vertical side plates 31,32 between which is mounted downwardly convergent plates 33,34,35 which have a V-shaped bottom plate 36 for kicking the cane stalks upwardly. The orienting means 18 is secured to arms which also support the shaft 26 of the metering means 17 this assembly being carried on shaft 37 to partake of an eccentric movement as indicated by the arrow in FIG. 3, by hydraulic motor 37A.

CANE DISPENSING MEANS

Figures 6, 7:
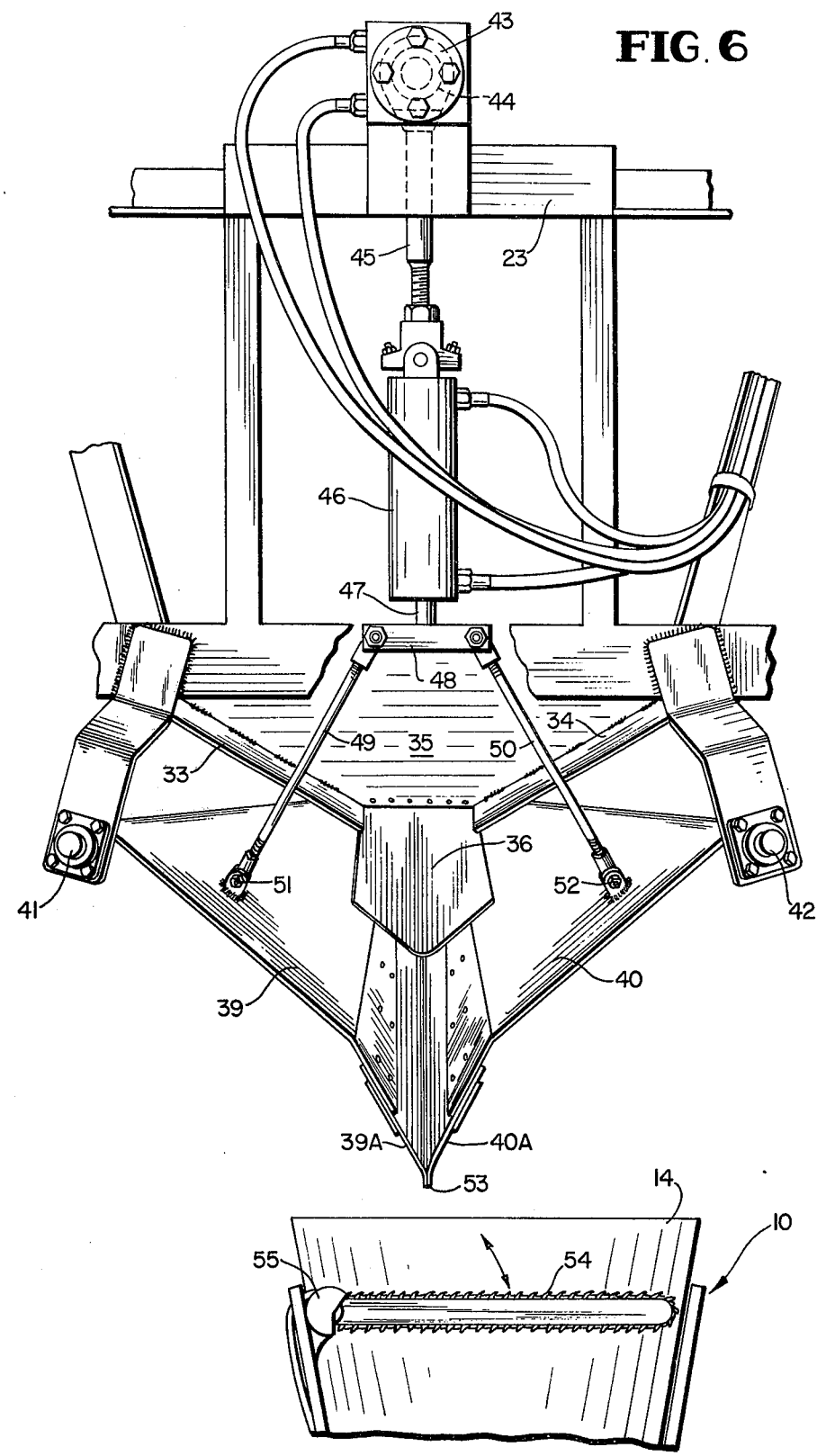
FIG. 6 is an end elevational view of the cane planter taken at the rear of the device along the lines 6—6 in FIG. 1.
FIG. 7 is a side elevational view of the sugar cane cutter taken along the lines 7—7 in FIG. 1.

The cane dispensing means 19, best seen in FIG. 6, comprises two plates 39,40 pivotally connected to the frame sides 21,22 at 41,42. The plates 39,40 are actuated between an open and closed position by a hydraulic motor 43 driving through eccentric 44 a shaft 45 adjustably connected to a cylinder 46 having a ram 47 to which is connected a cross head 48 each end of which drives rods 49,50 pivotally connected to the plates 39,40 at 51,52. The eccentric drive provides a vibratory live action to the cylinder 46 and its connected rods while opening and closing of the cane discharge mouth 53 between plates 39,40 is controlled by actuation of the cylinder 46 to stroke the ram 47 and actuate the rods 49,50 to move plates 39 and 40 actuating the cane discharge mouth 53. The plates 39,40 have canvas or rubber lips 39A–40A to provide a flexible closure.

While the cane planter is employed to plant cane stalks stood on their butt ends, that is whole stalks, it also works well with cut or short stalks which may be cut by a chain saw 54 driven by a hydraulic motor 55 positioned as shown in FIGS. 1 and 7. This saw 54 may be in the down position of FIG. 7 for cut stalks or pivoted up out of the way to plant whole stalks as shown by the arrow in FIG. 7.

As shown in FIG. 2 all mechanisms of the planter are hydraulically driven and controlled from a console 56 by levers 57 at an operators stand 58. The hydraulic system has its own sump 59 but receives primary pressure from line 60 coming from the main hydraulic pump on the tractor which pulls the cane cart (not shown).

Also carried by the frame 20 beneath the pivots 24 and located centrally between the cart wheels and in alignment with the discharge mouth 53 of the cane dispensing means is a plow 61 for opening the furrow into which the sugar cane stalks are discharged from the mouth 53.

IN OPERATION

With the frame 20 installed at the rear of the cane cart 10, as shown in FIG. 1, i.e. mounted on the pivots 24 and all hydraulic motors and cylinders connected through the console 56 and the main hydraulic plant of the tractor activated to provide pressure from the tractor main hydraulic pump, the pusher plate 14 pushes cane stalks stood on their butt ends toward the rear of the wagon, that is from the left toward right in FIG. 1, and as the butt ends of the stalks engage the metering means 17 the paddles 30 kick the butt ends out and cause the stalks to fall onto the cane orienting means 18, that is the stalks fall into the trough like structure defined by the plates 33 through 36 inclusive and the stalks are upended toward a horizontal attitude where they will fall substantially horizontally into the V-shaped trough defined by the plates 39,40 of the cane dispensing means 19. The hydraulic motor 43 driving through the eccentric 44 the support shaft 45 for the cylinder 46 will cause vibratory action to take place on the surface of plates 39 and 40.

When it is time to dispense sugar cane stalks from the discharge or planting means 19 through the mouth 53, the hydraulic cylinder 46 is actuated through the proper lever 57 on the console 56 which causes the ram 47 and its entrained cross head 48 and arms 49,50 to descend and open the mouth 53 to discharge sugar cane stalks.

The rate of feed or metering of the stalks from the cane cart to the cane orienting means is under the control of hydraulic motor 29 which has a valve lever control on the console 56 to either speed up or slow down the rate of feed of the metering device. The rate of kick or amount of kick imparted from the cane orienting means 18 is under the control of hydraulic motor 37A which likewise is controlled by a lever on the console 56. The opening and closing of the mouth 53 is timed by the operator riding on the stand 58 and all functions such as the metering, cane orienting and cane dispensing are subject to variations at the eye and hand of the operator so that an even flow of cane stalks into a furrow is attained. A variable with respect to the cane orienting means is attained particularly when the saw 54 is employed to cut cane stalks and thereby cause a shorter and a greater number of stalks to fall upon the cane orienting means 18 which must direct such stalks toward a horizontal attitude to fall substantially horizontally into the cane dispensing means 19. It will readily be appreciated that the over the ground speed of the cane cart 10 which is being pulled by a tractor will have a great deal of effect upon the rate of feed of the stalks by the pusher plate in the sugar cane cart as well as the metering feed rate, the amount of kicking and orienting of the cane stalks for gravity drop into the cane dispensing means 19.

What I claim is:

1. For use with a cane cart having a pusher plate for moving cane standing on its butt end from the front toward the rear of the cane cart, a cane planter comprising:
    a. a metering means comprising a rotary shaft across the transverse width of the cane cart and having paddles extending radially off said shaft and spaced circumferentially about said shaft and being of a radial length sufficient to engage the butt end of the stalks and move them rearwardly of the cart so that the stalks will fall onto said cane orienting means,
    b. cane orienting means positioned rearwardly of said metering means to engage the cane stalk delivered from said metering means to cause the cane stalks to assume a substantially horizontal attitude with the major axis of the stalks lying along the major axis of the cane cart, and
    c. cane dispensing means positioned beneath the horizontally oriented cane stalks to dispense the cane stalks horizontally into planting furrows in the ground.

2. A cane planter as claimed in claim 1 wherein said cane orienting means is a kicker plate pivotally mounted to swing up and down and extending transversely of the cane cart to engage the butt ends of cane stalks and having drive means to cause said kicker plate to up end the cane stalks in a horizontal attitude so that they will fall into the dispensing means with their major axis along the major axis of the cane cart.

3. A cane planter as claimed in claim 1 wherein said cane dispensing means comprises a pair of plates convergently mounted toward the ground defining a mouth directed downwardly and pulsing means connected to open and close the mouth of said convergent plates to dispense the stalks in a horizontal plane into the planting furrow as the cart is moved along the furrow.

4. A cane planter as claimed in claim 3 further comprising a plow carried by said planter forwardly of said cane dispensing means for opening the furrow into which the cane stalks are planted.

5. For use with a cane cart having a pusher plate for moving cane standing on its butt end from the front toward the rear of the cane cart; a cane planter comprising:
    a. a frame adapted to be pivotally mounted to the rear of the cane cart,
    b. metering means comprising a rotary shaft across the transverse width of said frame and having paddles extending radially off said shaft and spaced circumferentially about said shaft and being of a radial length sufficient to engage the butt end of the stalk and move it rearwardly of the cart so that the stalk will fall onto said cane orienting means,
    c. cane orienting means on said frame positioned rearwardly of said metering means to engage the butt end of the cane stalk delivered from said metering means to cause the cane stalk to assume a substantially horizontal attitude with the major axis of the stalk lying along the major axis of the cane cart, and
    d. cane dispensing means on said frame positioned beneath said cane orienting means to dispense the cane stalks horizontally into planting furrows in the ground.

6. A cane planter as claimed in claim 5 wherein said cane orienting means is a kicker plate pivotally mounted on said frame rearwardly of said metering means to swing up and down and extending transversely of the frame to engage the butt end of cane stalks and having drive means to cause said kicker plate to up end the cane stalks in a horizontal attitude so that they will fall into the dispensing means with their major axis along the major axis of the cane cart.

7. A cane planter as claimed in claim 5 wherein said cane dispensing means comprises a pair of plates pivotally mounted on said frame convergently toward the ground with their mouth directed downwardly and pulsing means connected between said frame and said plates to open and close the mouth of said convergent plates to dispense the stalks in a horizontal plane into the planting furrow as the cart is moved along the furrow.

8. A cane planter as claimed in claim 7 further comprising plow means carried by said frame centrally of said frame at its forward end in alignment with the mouth of said cane dispensing means.

* * * * *